(12) United States Patent
Manoukian et al.

(10) Patent No.: US 9,361,242 B2
(45) Date of Patent: Jun. 7, 2016

(54) RETURN STACK BUFFER HAVING MULTIPLE ADDRESS SLOTS PER STACK ENTRY

(71) Applicant: Imagination Technologies Limited, Kings Langley (GB)

(72) Inventors: Manouk Vartan Manoukian, Hemel Hempstead (GB); Hugh Jackson, Sydney (AU)

(73) Assignee: Imagination Technologies Limited, Kings Langley (GB)

( * ) Notice: Subject to any disclaimer, the term of this patent is extended or adjusted under 35 U.S.C. 154(b) by 5 days.

(21) Appl. No.: 14/608,630

(22) Filed: Jan. 29, 2015

(65) Prior Publication Data

US 2015/0220450 A1     Aug. 6, 2015

(30) Foreign Application Priority Data

Jan. 31, 2014  (GB) .................................. 1401687.7
Jul. 29, 2014  (GB) .................................. 1413413.4

(51) Int. Cl.
| | | |
|---|---|---|
| *G06F 12/12* | (2016.01) | |
| *G06F 9/30* | (2006.01) | |
| *G06F 9/44* | (2006.01) | |
| *G06F 9/38* | (2006.01) | |

(52) U.S. Cl.
CPC ............ *G06F 12/122* (2013.01); *G06F 9/3005* (2013.01); *G06F 9/3861* (2013.01); *G06F 9/4425* (2013.01); *G06F 9/4426* (2013.01); *G06F 2212/69* (2013.01)

(58) Field of Classification Search
CPC .... G06F 12/122; G06F 9/3005; G06F 9/3861; G06F 9/4425; G06F 9/4426
See application file for complete search history.

(56) References Cited

U.S. PATENT DOCUMENTS

| | | |
|---|---|---|
| 6,151,671 A | 11/2000 | D'Sa et al. |
| 2006/0149948 A1 | 7/2006 | Yokoi |
| 2007/0061555 A1 | 3/2007 | St. Clair et al. |
| 2007/0106888 A1 | 5/2007 | Chaudhry et al. |
| 2009/0094444 A1 | 4/2009 | Dieffenderfer et al. |
| 2013/0138931 A1 | 5/2013 | Gunna et al. |

FOREIGN PATENT DOCUMENTS

JP             10269081 A        10/1998

OTHER PUBLICATIONS

IBM, "Method for Saving Space on Stack for Recursive and Non-Recursive Function Calls," IP.com Electronic Publication No. IPCOM000016009D, Jun. 21, 2003.

*Primary Examiner* — Benjamin Geib
(74) *Attorney, Agent, or Firm* — Vorys, Sater, Seymour and Pease LLP; Vincent M DeLuca

(57) ABSTRACT

A return stack buffer (RSB) is modified such that each entry comprises two or more address slots. When a function is called, the address following the function call is pushed to the RSB and stored in a selected one of the address slots in a top entry in the RSB. One or more pointer bits within the entry are set to indicate which slot the address was stored in.

18 Claims, 9 Drawing Sheets

RETURN STACK BUFFER HAVING MULTIPLE ADDRESS SLOTS PER STACK ENTRY

BACKGROUND

A return stack buffer (RSB), which is also known as a return address stack (RAS), is used to predict return addresses from functions. The address following a function call is pushed to the RSB and then subsequently popped when a return is found. However, the RSB can become corrupted where speculation is used because a number of pushes and pops to/from the stack can be performed speculatively. In a processor architecture with prediction and fetch decoupled from execution, a prediction can be made every cycle and so the RSB can become very corrupted such that a single mis-speculation can lead to multiple mis-speculations (as a result of the corrupted RSB).

A solution to the corruption of the RSB as a result of speculatively executed instructions is to store a pointer to the top of the RSB with every prediction that is made. If the prediction turns out to be wrong, then the stored pointer is restored. This preserves alignment of the RSB but information can be lost due to speculative pops from the RSB. To address this, the idea may be extended to store the top of the RSB along with the pointer such that on a mis-speculation at least one speculative pop can be restored using the stored data.

The embodiments described below are not limited to implementations which solve any or all of the disadvantages of known return stack buffers and methods of operating a processor comprising a return stack buffer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Modified return stack buffers (RSBs) are described. In one embodiment, the RSB is modified such that each entry comprises two or more address slots. When a function is called, the address following the function call is pushed to the RSB and stored in a selected one of the address slots in a top entry in the RSB. One or more pointer bits within the entry are set to indicate which slot the address was stored in.

A first aspect provides a method of operating a processor, the method comprising: in response to a function call, storing an address following the function call in one of a plurality of address slots in a top entry in a modified return stack buffer and updating a stack pointer and stack pointer bit to point to the entry and the address slot in which the address was stored and setting a value of one or more pointer bits in the entry, the one or more pointer bits comprising a first part indicating at least a most recently written address slot in the entry and the second part indicating, for each of the plurality of address slots in the entry, a most recently written address slot in the previous entry at the time that the particular one of the plurality of address slots in the entry was written; and in response to a function return, reading an address from an address slot in an entry in the modified return stack buffer identified by the stack pointer and stack pointer bit, updating the stack pointer to point to the previous entry and updating the stack pointer bit based on the second part of the pointer bits for the entry and the address slot from which the address was read.

A second aspect provides a processor comprising: a fetch stage; and resources arranged to store a modified return stack buffer, wherein the fetch stage is arranged: in response to a function call, to store an address following the function call in one of a plurality of address slots in a top entry in a modified return stack buffer, to update a stack pointer and stack pointer bit to point to the entry and the address slot in which the address was stored and to set a value of one or more pointer bits in the entry, the one or more pointer bits comprising a first part indicating at least a most recently written address slot in the entry and the second part indicating, for each of the plurality of address slots in the entry, a most recently written address slot in the previous entry at the time that the particular one of the plurality of address slots in the entry was written; and in response to a function return, to read an address from an address slot in an entry in the modified return stack buffer identified by the stack pointer and stack pointer bit, to update the stack pointer to point to the previous entry and to update the stack pointer bit based on the second part of the pointer bits for the entry and the address slot from which the address was read.

A third aspect provides computer readable storage medium having encoded thereon computer readable program code for generating a processor according to the sixth aspect.

A fourth aspect provides a computer readable storage medium having encoded thereon computer readable program code for generating a processor configured to perform the method according to the fifth aspect.

Further aspects provide a method substantially as described with reference to FIG. 8 of the drawings and a modified return stack buffer substantially as described with reference to FIG. 7 of the drawings.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
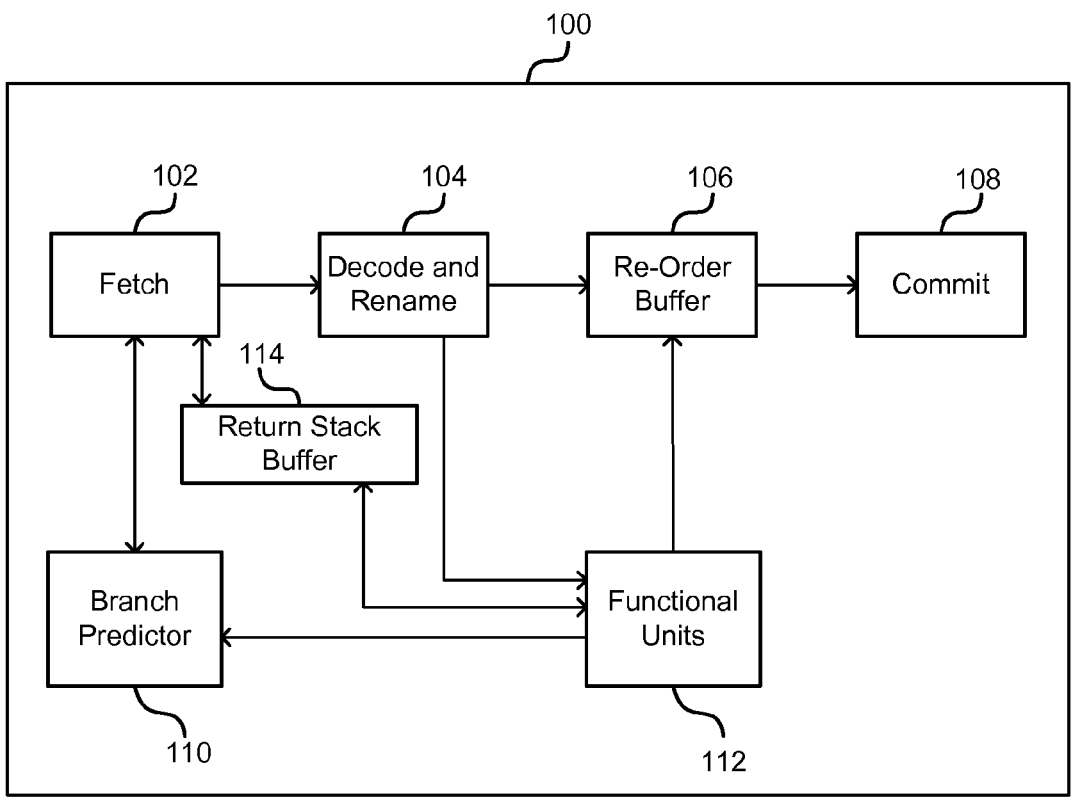
FIG. 1 shows a schematic diagram of an example out-of-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

A stack is typically used to provide a region of temporary storage and is implemented as last-in first-out (LIFO) storage resources (which may alternatively be referred to as a first-in last-out FILO) such that data is removed from the stack strictly in the reverse order to which it was added to the stack. The stack may be considered to grow up or down from a stack origin; however, in either case, the top of the stack, which is the most recently added element on the stack, may be identified by a stack pointer which typically points to the next non-used entry. A stack may be a software stack; however, the stack described below is implemented in hardware and uses the concept of the stack to mimic (in a manner which is transparent to the software) the behavior of the nested function call programming paradigm. This is described in more detail below.

For the purposes of the following description, a stack and in particular a return stack buffer (RSB) is considered to grow up such that the value of the stack pointer increases when data is pushed to the stack and decreases when data is popped from the stack. It will be appreciated, however, that the methods described herein are equally applicable if a stack and/or the RSB is considered to grow down (where the value of the stack pointer decreases when data is pushed to the stack and increases when data is popped from the stack).

As described above, a return stack buffer (RSB), which is also known as a return address stack (RAS), may be used to predict return addresses from functions. Problems arise, however, where speculation is used because mis-predictions can result in the RSB becoming corrupt. Storing a pointer to the top of the RSB for every prediction that is made preserves the alignment of the stack, but information can still be lost through speculative pops from the RSB. By storing one or more entries at the top of the RSB, along with a pointer to the top, with each prediction enables speculative pops to be restored, but requires more storage space (which corresponds to area of silicon within the processor). To ensure that no information is lost as a result of speculative pops, the entire RSB could be stored each time a prediction is made; however, this is not practical in many applications because of the resulting storage requirements (which may increase the area of the device significantly) given that the RSB typically comprises 8-16 entries, each of which comprise a 32-bit address.

Two embodiments which address the problem of corruption of the RSB are described below and both involve use of improved/modified RSBs. In the first embodiment, the RSB is modified such that it does not comprise addresses but comprises indexes to a new data structure (or look-up table) which is used to store the return addresses. This has the effect that the RSB is much smaller in size (e.g. it comprises 8-16 entries each of which comprises $\log_2$(table_size) number of bits, where table_size is the maximum number of entries in the look-up table) and as a result, in some examples, the entire RSB may be stored with every prediction without a significant impact on the size of the device.

In the second embodiment, the structure of the RSB is modified to comprise two (or more) addresses per entry and at least one pointer bit. When an address is added to the RSB it is stored in one of the two (or more) address slots in the top entry in the RSB and the pointer bit is set to indicate the slot in which the address was stored. When an address is "popped" from the RSB, the pointer bit is reset so that it no longer points to the popped address (and the stack pointer is updated in the usual way) but the popped address is not removed from the RSB. When an address is subsequently added to the RSB, it is stored in a different one of the address slots in the top most entry in the RSB and the pointer bit set to indicate the slot in which the address was stored, such that the most recently popped address is not overwritten. In this solution, a pointer to the top of the stack is stored for every prediction along with the pointer bit for the top entry of the stack; however, it is not necessary to store the entire RSB, or entries at the top of the RSB, for each prediction.

Using either embodiment described herein, mis-predictions caused by the corruption of the RSB are reduced or eliminated. In the first embodiment, a modified RSB is stored for every prediction which can then be used when a mis-prediction occurs. In the second embodiment, an RSB with a different structure is used which reduces the chances of corruption of the RSB.

FIG. 1 shows a schematic diagram of an example out-of-order processor 100 in which the methods described herein may be implemented. In this example the processor 100 is a single-threaded processor, however the methods are also applicable to multi-threaded processors (where each thread would maintain a separate RSB).

The processor 100 comprises a fetch stage 102, a decode and rename stage 104, a re-order buffer 106, a commit stage 108, a branch predictor 110, one or more functional units 112 (which each comprise one or more execution pipelines) and an RSB 114 (which may be stored in flip-flops within the processor 100).

The fetch stage 102 is configured to fetch instructions from a program (in program order) as indicated by a program counter (PC). The fetch stage 102 also pushes and pops entries to the RSB 114 (which may be part of the fetch stage 102). Where a new look-up table is used (e.g. in the first embodiment described herein), this may be stored in the fetch stage 102 or the resources of the RSB 114 and maintained by the fetch stage 102.

Once an instruction is fetched it is provided to the decode and rename stage 104 which is arranged to interpret the instructions and perform register renaming (e.g. using a register renaming map/table).

After an instruction passes through the decode and rename stage 104 it is inserted into a reorder buffer 106 (ROB) and dispatched to a functional unit 112 for execution. The re-order buffer 106 is a buffer that enables the instructions to be executed out-of-order, but committed in-order. The re-order buffer 406 holds the instructions that are inserted into it in program order, but the instructions within the ROB 406 can be executed out of sequence by the functional units 112. Instructions output from the re-order buffer 106 are provided to a commit stage 108, which commits the results of the instructions to the register/memory.

The processor 100 also comprises a branch predictor 110 which is configured to predict which direction the program flow will take in the case of instructions known to cause possible flow changes, such as branch instructions. The branch predictor 110 is responsible for the speculation of the instructions that are not predicted by the RSB 114. The return addresses that are stored in the RSB 114 are independent from any branch prediction target and are provided by the fetch stage 102. In various examples, the return address is usually the function call address +4.

Branch prediction is useful as it enables instructions to be speculatively executed by the processor 100 before the outcome of the branch instruction is known. The branch predictor 110 can receive inputs from the fetch stage 102 and decode and rename stage 104 relating to new instructions, and input from the functional units 112.

When the branch predictor 110 predicts the program flow accurately, this improves performance of the processor 100. However, if the branch predictor does not correctly predict the branch direction, then a mis-prediction occurs which needs to be corrected before the program can continue. To correct a mis-prediction, the speculative instructions sent to the ROB 106 are abandoned, and the fetch stage 102 starts fetching instructions from the correct program branch. As described in more detail below, this may involve the fetch stage 102 restoring the RSB using a stored version of the RSB and an associated stored pointer to the top of the RSB (e.g. in the first embodiment described herein) or alternatively, the RSB may be restored using a stored pointer to the top of the RSB and an associated stored pointer bit(s) for the top entry in the RSB (e.g. in the second embodiment described herein).

Each functional unit 112 is responsible for executing instructions and may be configured to execute specific types of instructions. For example the functional units 112 may comprise one or more of a load-store unit, an integer unit, a floating point unit (FPU), a digital signal processing (DSP)/single instruction multiple data (SIMD) unit, or a multiply accumulate (MAC) unit. The load-store unit reads data to and writes data from the L1 cache and memory beyond that. In some instances, the load-store unit may calculate addresses and it may (or may not) contain the L1 cache and perform the data/tag RAM look-ups. An integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The pipelines within the functional units may have different lengths and/or complexities. For example, a FPU pipeline is typically longer than an integer execution pipeline because it is generally performing more complicated operations.

It will be appreciated that other processors may not comprise all the functional elements shown in FIG. 1 (i.e. one or more of the functional elements shown in FIG. 1 may be omitted) and may, in some examples, comprise additional functional elements not shown in FIG. 1 and/or additional connections between functional units (e.g. there may in some examples be a connection between functional units 110 and the RSB 114). For example, while executing the instructions received from the decode and rename stage 104, each functional unit 110 performs reads and writes to physical registers in one or more shared register files (not shown in FIG. 1). To reduce latency, recently written registers may be stored in a register file cache (also not shown in FIG. 1).

Figure 2:
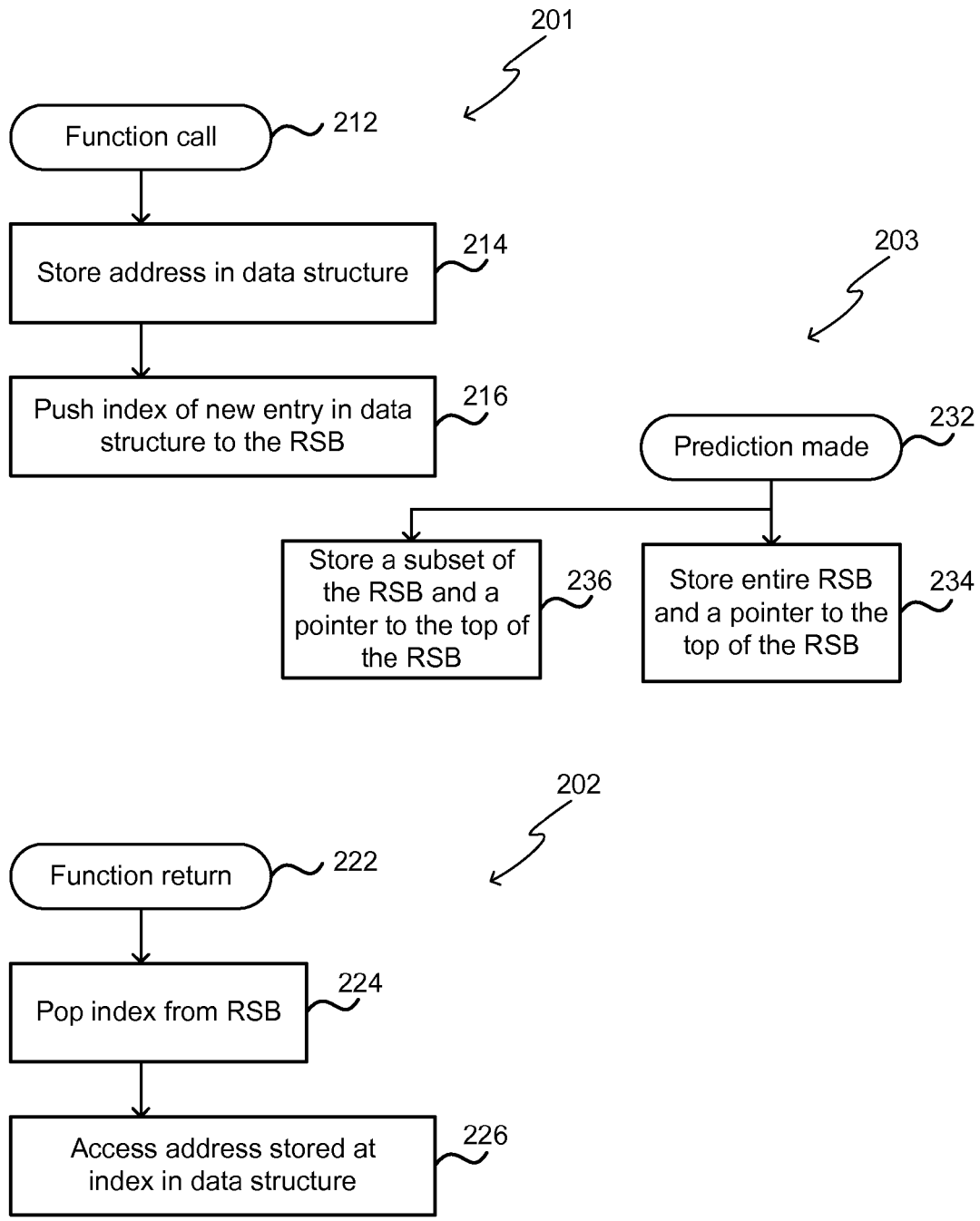
FIG. 2 shows three example flow diagrams which may be implemented in the processor shown in FIG. 1 and which relate to the operation and use of a modified RSB according to a first embodiment.
Figure 3:
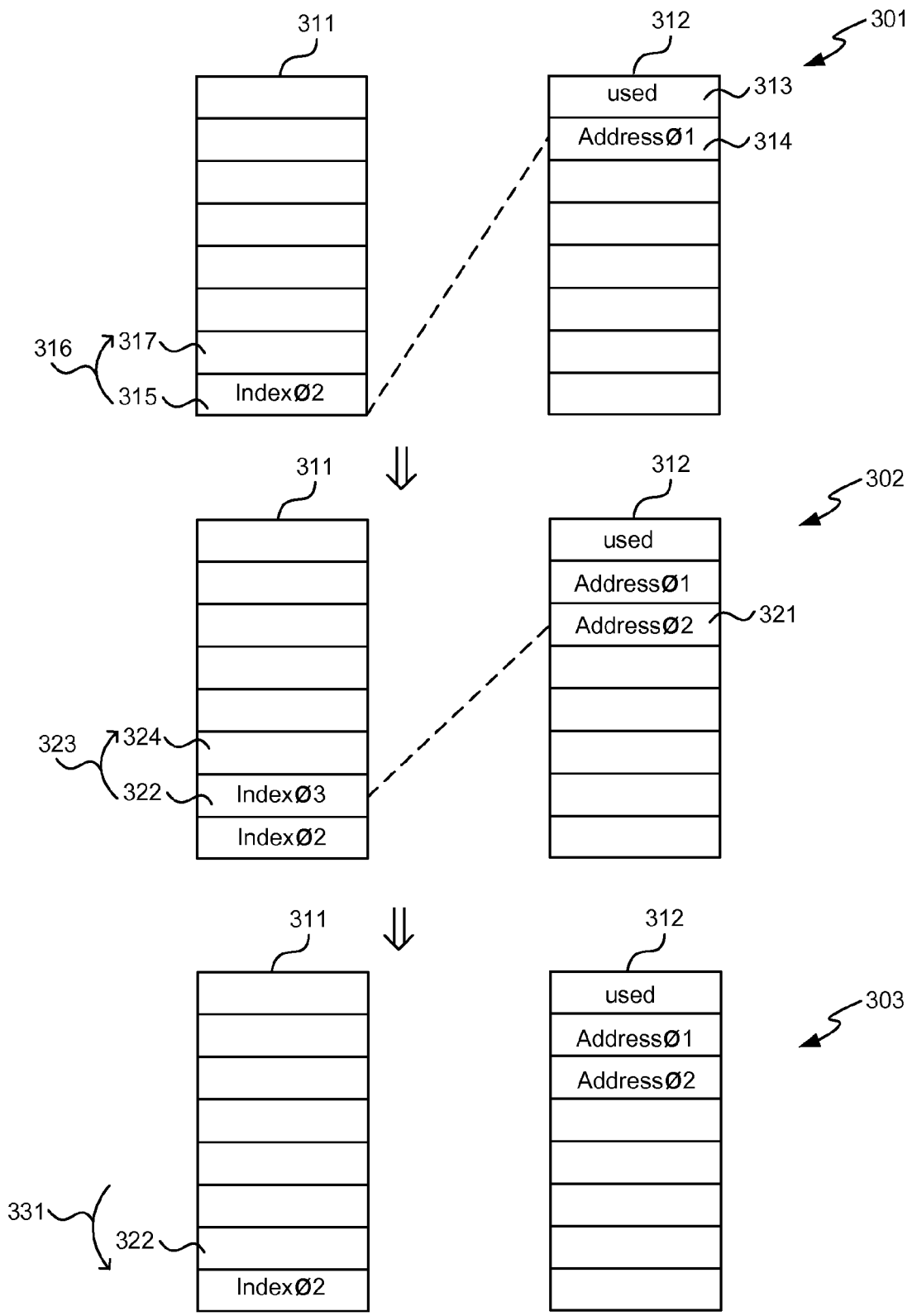
FIG. 3 shows schematic diagrams of a modified RSB and new data structure according to a first embodiment.

The first embodiment can be described in more detail with reference to FIGS. 2-6. FIG. 2 shows three example flow diagrams 201-203 which may be implemented in the processor 100 shown in FIG. 1 and which relate to the operation and use of the RSB. FIG. 3 shows schematic diagrams of the modified RSB and new data structure (which may also be referred to as a look-up table or fully associative cache).

As shown in the first flow diagram 201, when a function is called (block 212), an unused entry in a new look-up table is identified and the address following the function call is stored in that entry (block 214). The index of the entry in which the address is stored (in the new look-up table) is then pushed to the RSB (block 216). This is shown in the first schematic diagram 301 in FIG. 3, which shows the RSB 311 and the new look-up table 312. The first entry 313 in the new look-up table is already used, so the address (labeled 'Address01' in this example) is stored in the second entry 314. The index of this second entry 314 (labeled 'Index02' in this example) is then pushed to the RSB 311 and comprises the new top entry 315 in the RSB 311. The stack pointer for the RSB 311 is updated (as indicated by arrow 316) as a result of the new entry to point to the next non-used entry 317.

If the method of flow diagram 201 is subsequently repeated in response to another function call (e.g. for nested functions), another address ('Address02') is stored in the new look-up table 312 (in block 214), as shown in the second schematic diagram 302 in FIG. 3, and the index ('Index03') of the entry 321 in which it is stored is pushed to the RSB 311 (in block 216). This new entry 322 in the RSB 311 is now the top entry and stack pointer for the RSB 311 is updated (as indicated by arrow 323) as a result of the new entry to point to the next non-used entry 324.

As described above, the method of flow diagram 201 may be implemented by the fetch stage 102 in the processor 100 shown in FIG. 1 and the new look-up table 312 may be stored in the resources of the RSB 114 or within the fetch stage 102 shown in FIG. 1.

If subsequently a prediction is made (block 232), as shown in the third flow diagram 203 in FIG. 2, the entire RSB 311 may be stored along with a pointer to the top entry (i.e. entry 322) in the RSB (block 234). Alternatively, the pointer that is stored may point to the next non-used entry (i.e. entry 324). As described above, this flow diagram may be implemented by the fetch stage 102 in the processor 100 shown in FIG. 1 and the stored copies of the RSB and pointer may be stored in registers/RAMs in the processor 100 (e.g. along with information about each branch prediction made). If the prediction (made in block 232) is later discovered to be a mis-prediction, the RSB is restored using the information which was stored (in block 234). A pointer is stored (in this example) along with the entire RSB (in block 234) because the RSB may be allowed to wrap around if it becomes full. In other examples (e.g. where the RSB does not wrap around or in other scenarios), it may not be necessary to store a pointer; however even where a pointer is stored, the additional storage requirement is small (i.e. $\log_2$(RSB size)).

As the RSB in this embodiment stores indexes rather than full addresses, where the size (i.e. number of bits) of an index is significantly smaller than the size of a full address (which is typically 32 bits), storing the entire RSB each time a prediction is made (as shown in block 234 of flow diagram 203) does not require a huge amount of storage. As described above, the size of the index is dependent upon the size of the look-up table (e.g. index size=$\log_2$(table_size), where table_size is the maximum number of entries in the look-up table).

In an alternative example, however, a subset of the RSB may be stored each time a prediction is made (block 236), where the term 'subset' refers to a proper subset. By storing only a subset of the RSB, along with a pointer to the top entry, this reduces further the storage required. In an example, the top M entries (where M is a natural number, e.g. M=3) may be stored for each prediction along with a pointer to the top entry. Using this information, the RSB may be partially reconstructed in the event of a mis-prediction.

In response to a function return (block 222), as shown in the second flow diagram 202 in FIG. 2, the top entry (i.e. the top index) is popped from the RSB (block 224) and that index is used to look up an address in the new look-up table (block 226). As described above, this address is the address following the call to the function which has now returned. Referring to the example shown in the second schematic diagram 302 in FIG. 3, the top index, Index03, is popped from the RSB 311 (in block 224) and used to look up an address, Address02, in the new look-up table 312 (in block 226).

As a result of the popping of an entry (in block 224), the RSB 311 now only has one entry 315, as shown in the third schematic diagram 303, and the stack pointer for the RSB 311 is updated (as indicated by arrow 331) as a result of the new entry to point to the next non-used entry, which is now entry 322. In the example shown in diagram 303 in FIG. 3, the new look-up table 312 still includes the entry for the address ('Address02') which corresponds to the popped entry from the RSB. Mechanisms by which entries may be cleared from the new look-up table 312 are described in more detail below.

Although FIG. 3 shows the modified RSB 311 and the new look-up table 312 having the same number of entries, this is by way of example only and in other examples the new look-up table may have more entries than the modified RSB (e.g. the modified RSB may have 8 entries and the new look-up table may have 16 entries), or the new look-up table may have fewer entries than the modified RSB.

Figure 4:
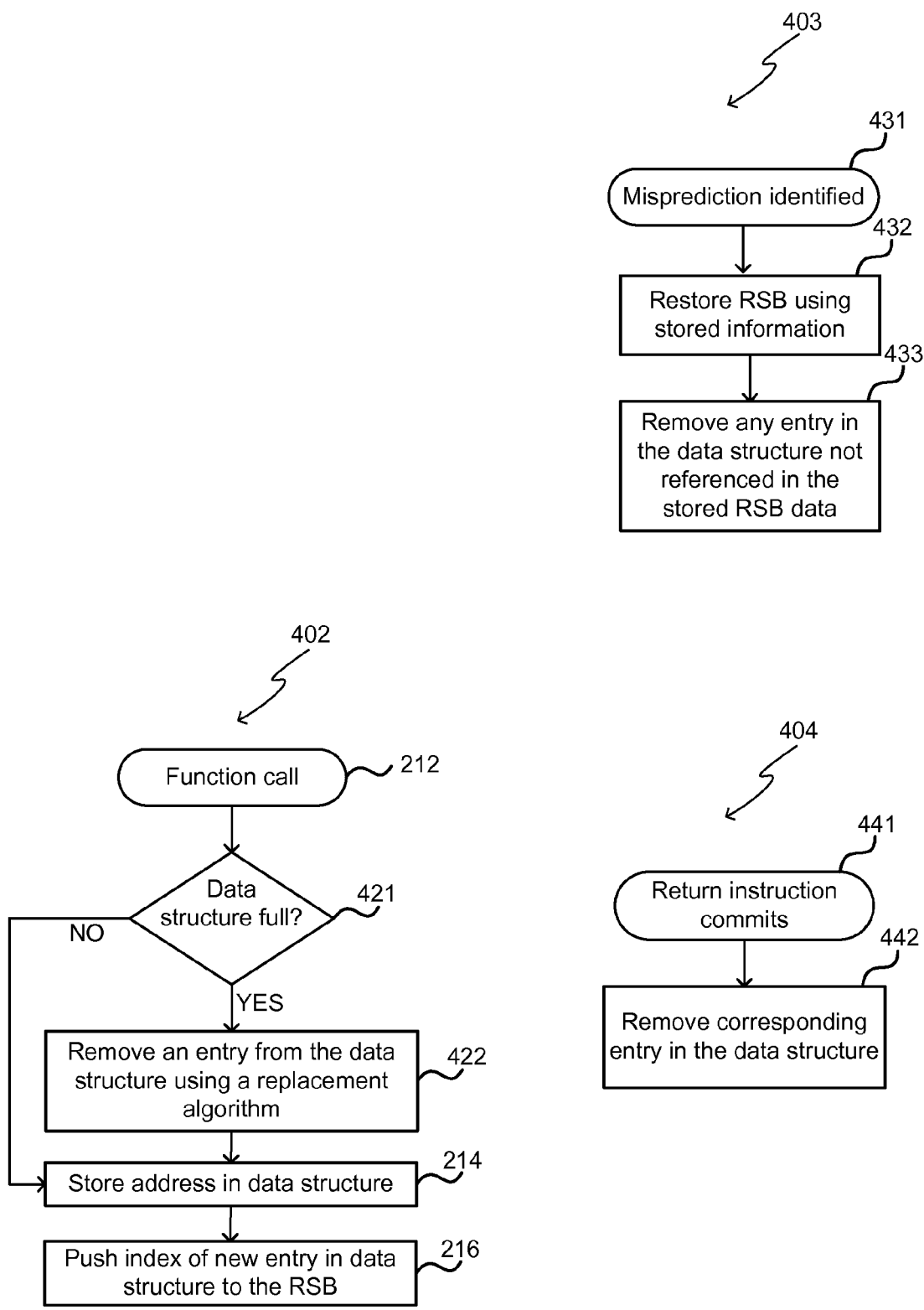
FIG. 4 shows three example flow diagrams of methods of removing entries from the new data structure.
Figure 5:
FIG. 5 is a schematic diagram showing an example modified RSB according to a first embodiment.
Figure 6:
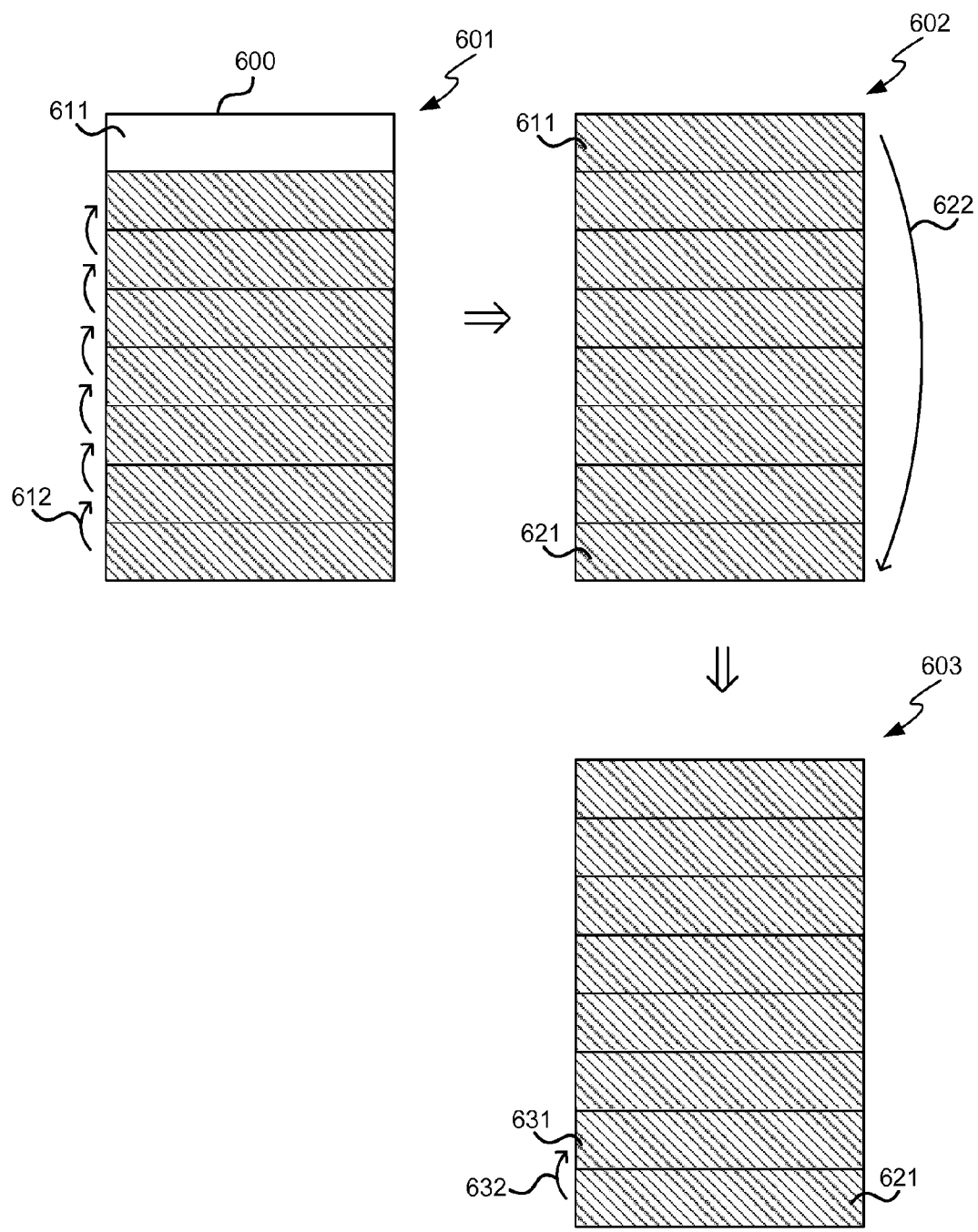
FIG. 6 shows schematic diagrams illustrating overflow of the RSB.

As described above, the new look-up table has a limited number of entries (e.g. 16 entries) and the size of the index (and hence the size of the RSB) is dependent upon the maximum number of entries in the look-up table. There are many different mechanisms which may be used to remove (or clear) entries from the look-up table to make space for further addresses to be stored, and various examples are shown in FIG. 4. These methods may be implemented within the fetch stage 102 within the processor 100 shown in FIG. 1.

In the first example flow diagram 402, entries are removed from the look-up table when it is full ('Yes' in block 421) using a replacement algorithm (block 422). Any suitable replacement algorithm may be used, for example, Least Recently Used (LRU).

In the second example flow diagram 403, when a mis-prediction is identified (block 431), the RSB is restored using stored information (block 432). As described above, this stored information may comprise an entire RSB (e.g. as stored in block 234 of FIG. 2) or a subset of the RSB (e.g. as stored in block 236 of FIG. 2). Any entry in the look-up table which is not referenced in the stored RSB data (i.e. the entire RSB from block 234 or the subset of the RSB from block 236) is then cleared from the look-up table (block 433).

In the third example flow diagram 404, entries are cleared from the look-up table (in block 442) when the corresponding return instruction (i.e. the return instruction in block 222 which caused the index of the address to be popped from the stack in block 224 of FIG. 2) commits (block 441).

Although the three examples 402-404 are described separately above and may be used independently of each other, in various examples the three methods may be combined and used together, such that in the event of function call when the data structure is full, example 402 is used, when a mis-prediction is identified, example 403 is used and when a return instruction commits, example 404 is used. In further examples, any two of the three examples may be used together.

In the above description of the flow diagrams 402-404 the terms 'remove' and 'clear' are used interchangeably to refer to the removal of data from the look-up table in order to free up entries for storing new addresses. Alternatively, instead of actually removing the data, the particular entries may be invalidated in the look-up table and invalid entries may be considered non-used entries where new addresses may be stored (e.g. in block 214 in FIG. 2). Where invalidation is used, each entry 502 in the look-up table 500 may have an associated validity bit 504 as shown in the schematic diagram in FIG. 5. The validity bit (which may be a single bit or more than one bit) has one value (e.g. '1') to indicate that the associated entry is valid and a different value (e.g. '0') to indicate that the associated entry is invalid. These validity bits 504 may also be used in the event of an overflow of the RSB, as described below.

Where validity bits are used, in the event that a function return (e.g. in block 222 of FIG. 2) results in the popping of an index (in block 224) that references an invalid address, the fetch stage 102 does not jump to that address, but instead alternative mechanisms are used to determine the next address.

As described above, the RSB only comprises a limited number of entries (e.g. 8 entries) and so there may be occasions where an index is pushed (e.g. in block 216 of FIG. 2) to an already full RSB. This is termed an 'overflow'. In the event of an overflow, the RSB may wrap around as can be described with reference to the schematic diagrams in FIG. 6. In the first diagram 601, the RSB 600 is nearly full with, in this example, 7 of the 8 entries being full (as indicated by the shading). The stack pointer for the RSB therefore points to the next non-used entry 611. As described earlier, for the purposes of the description, a stack is considered to grow upwards (e.g. as indicated by the arrows 612).

When another index is pushed to the RSB, as shown in the second diagram 602, it is stored in entry 611 (which is now full and therefore shown shaded in FIG. 6) and the stack pointer for the RSB wraps round (as indicated by arrow 622) and points to the bottom entry 621 in the RSB. This entry is not non-used; however, it is the next location to which an index is to be pushed.

When a further index is pushed to the RSB, as shown in the third diagram 603, it is stored in the entry (entry 621) identified by the stack pointer, overwriting the previous index stored in that location and the stack pointer is updated (as indicated by arrow 632) to point to the next entry to be used for storing an index (entry 631). Where an index is overwritten in the RSB in this way, the corresponding address in the look-up table may be cleared or invalidated or alternatively, the address may remain in the look-up table (e.g. as there is a chance that it might be required if a mis-prediction causes the restoration of an RSB that references that address) and only be cleared/invalidated when the function that caused the overflow (i.e. that resulted in the index being pushed which overwrote a previous entry) is committed.

The first embodiment described above results in a reduction in the size of the RSB which enables the entire RSB to be stored with each prediction. Alternatively, the amount of data which is stored for each prediction made may be reduced further by only storing a subset of the modified RSB (i.e. the RSB comprising the indexes) for each prediction (along with a pointer, as described above). It does, however, result in a two-stage look-up process as upon a function return an index is popped from the RSB and the index is then used to look-up the address which should be jumped to (e.g. as shown in flow diagram 202 in FIG. 2). In order to reduce any latency associated with this two-stage process, the address corresponding to the index at the top of the RSB may be accessed ahead of time (e.g. prior to the index actually being popped and in some examples prior to the function return which triggers the popping).

Figure 7:
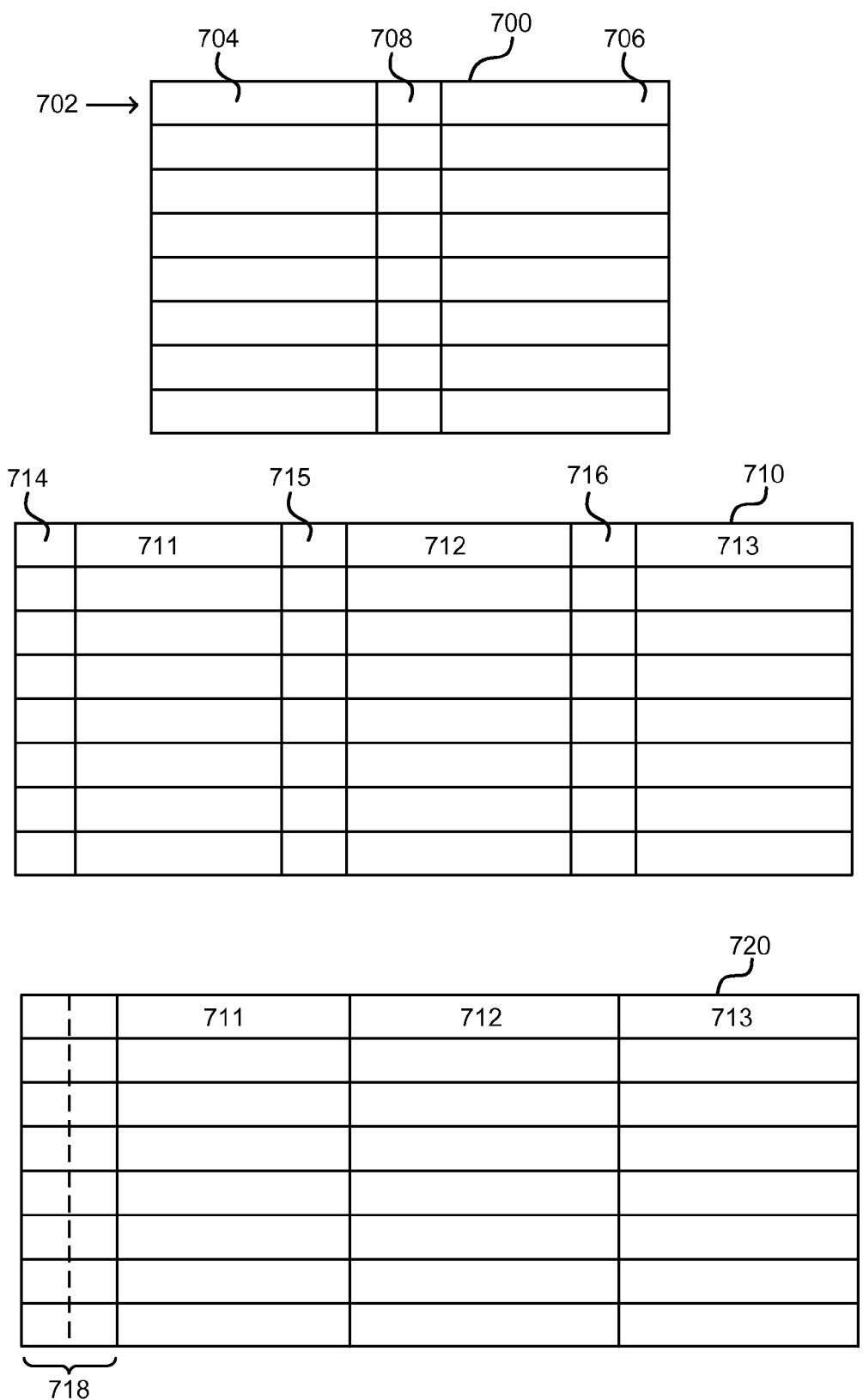
FIG. 7 shows schematic diagrams of three example modified RSBs according to a second embodiment.

The second embodiment can be described in more detail with reference to FIGS. 7-9. In this embodiment, the structure of the RSB is modified to comprise two (or more) addresses per entry and at least one pointer bit and an example is shown in FIG. 7. FIG. 7 is a schematic diagram showing an example modified RSB 700 which comprises 8 entries 702, where each entry comprises two address slots 704, 706 and one or more pointer bits 708. In other examples, the modified RSB may comprise more than two address slots and additional pointer bits. Two further examples 710, 720 are shown in FIG. 7 and it will be appreciated that further arrangements may also be used (e.g. aspects of any of the arrangements 700, 710, 720 may be combined) and a modified RSB may comprise more/fewer than 8 entries.

In the second example 710 shown in FIG. 7, the modified RSB (which also comprises 8 entries by way of example only) comprises three address slots 711-713 and each slot has one or more associated pointer bits 714-716. As is described in more detail below, the role of the pointer bit(s) 714-716 (and pointer bits 708 in the first example 700) is to identify one of the address slots in the entry (i.e. the current entry) as being the most recently written address and also to identify the position of the most recently added address in the previous entry, at the time of inserting the current entry. In the third example, which also comprises three address slots 711-713, all the pointer bits 718 are grouped together within in the entry (unlike the second example 710), where these pointer bits 718 together identify one of the three address slots in that entry as being the most recently written address (e.g. by having the value 01, 10 or 11) or indicate the relative order of writing between the three address slots and also indicate, for each address slot in the (current) entry, which address slot in the previous entry was written directly before the particular slot was written. For example, if the slots are labeled 1, 2, 3, if slot 1 is written to in entry 1 and then slot 2 is written in entry 2, the pointer bits associated with entry 2 will identify slot 2 as the most recently written slot in the current entry (entry 2) and slot 1 as the slot in the previous entry (entry 1) which was written to directly before writing to slot 2 in entry 2. In a further example, not shown in FIG. 7, a modified RSB with two address slots per entry may have one or more pointer bits per address slot (e.g. by combining aspects of examples 700 and 710). In other examples, the modified RSB may have more than three address slots per entry.

As described above, the pointer bits for an entry provide information about the order in which address slots in that entry (the current entry) were written but also information about the previous entry and in particular, for each address slot in the current entry which address slot was written to in the previous entry directly before that address slot in the current entry was written to. This information on the previous entry is used when removing an address from a slot in an entry to determine which slot to go back to in the previous entry.

Figure 8:
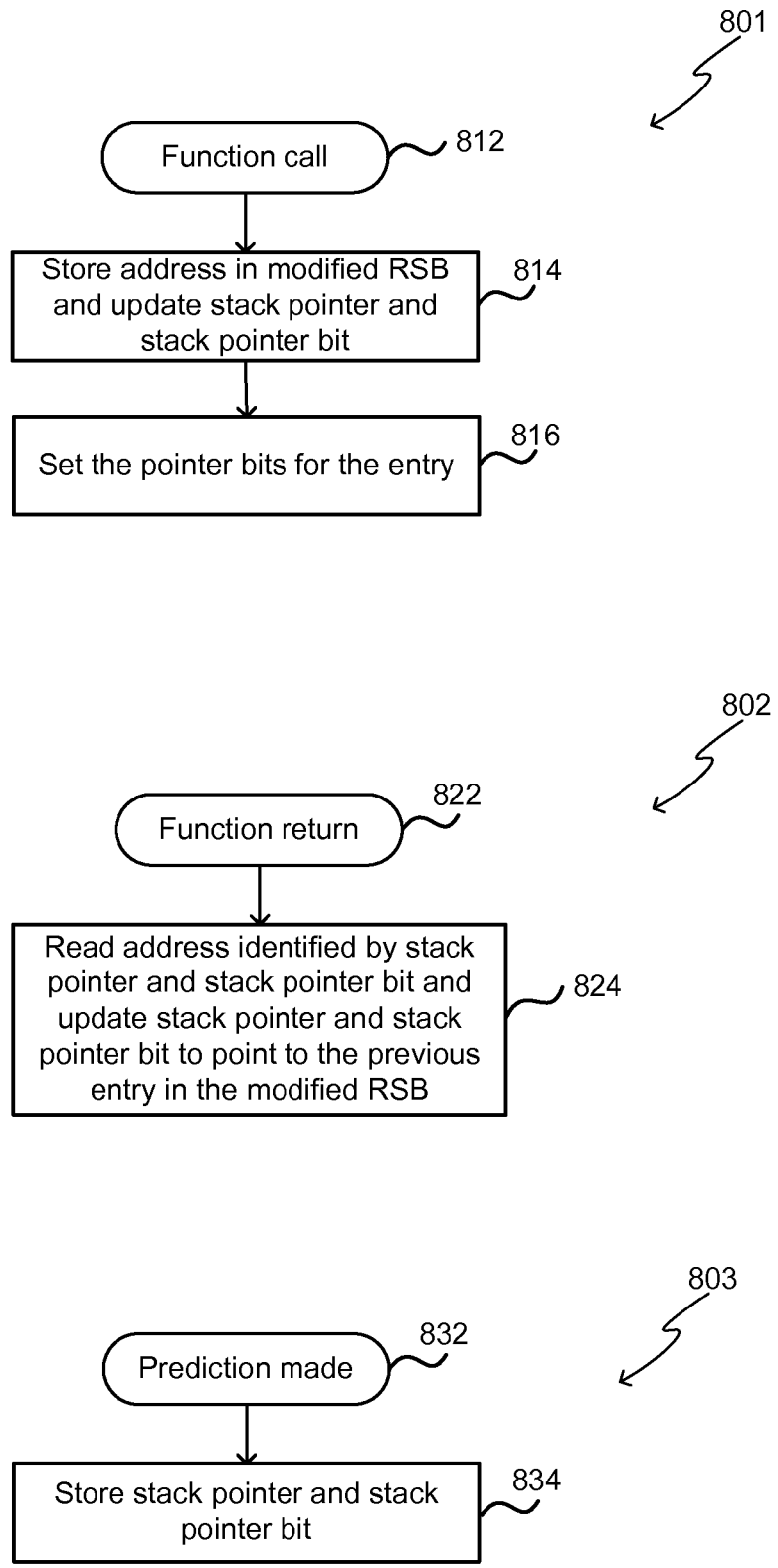
FIG. 8 shows three example flow diagrams which may be implemented in the processor shown in FIG. 1 and which relate to the operation and use of a modified RSB according to a second embodiment.

FIG. 8 shows three example flow diagrams 801-803 which may be implemented in the processor 100 shown in FIG. 1 (e.g. by the fetch stage 102) and which relate to the operation and use of the modified RSB. FIG. 9 shows schematic diagrams of the modified RSB and for the purposes of explanation only, the modified RSBs are shown having only four entries. It will be appreciated that the methods described may be used with any form of modified RSB (e.g. as described above with reference to FIG. 7). It will be seen from the following description that where the modified RSB is used, the stack pointer has an associated bit (referred to herein as the stack pointer bit) which points to one of the address slots in the top entry (pointed to by the stack pointer). This stack pointer bit is used in conjunction with the stack pointer to know where to read from the RSB when predicting a function return (e.g. the stack pointer points at the most recently written entry and the pointer bit points at the most recently written slot in the entry).

As shown in the first example flow diagram 801, when a function is called (block 812), the address following the function call is stored in one of the address slots in the next entry in the modified RSB and the stack pointer and stack pointer bit for the RSB are updated to point to the newly written slot (block 814). Where there is an empty address slot in the next entry in the RSB, the address is stored in an empty slot. However, where both address slots already contain an address, a replacement algorithm (such as LRU) is used to determine which address slot to store the address in. Along with storing the address (in block 814), the pointer bits in the entry are set to indicate the most recently written address slot in the entry and the most recently written address in the previous entry at that time (block 816). For the purposes of the following examples, the pointer bits for each slot in each entry comprise two parts, denoted A and B, with the first part (bit A) indicating whether it is the most recently written address slot in the entry (or a relative order of writing of the address slots in the entry) and the second part (bits B) indicating the most recently written address slot in the previous entry at the time that the particular slot (in the current entry) was written. As described above, although the bits A for each of the address slots may be combined (e.g. in a single bit or pair of bits to indicate the most recently written address slot in the current entry), separate bits B are provided for each address slot (e.g. bit B-left and bit B-right for the example below with two address slots per entry). In use, although the value of bit A for a particular address slot may change (e.g. when another address slot in the same entry is subsequently written), the bits (bit B) that points to the previous entry will not change until the particular address slot is overwritten. The bits B are used such that the function returns work even after a misprediction.

Figure 9:
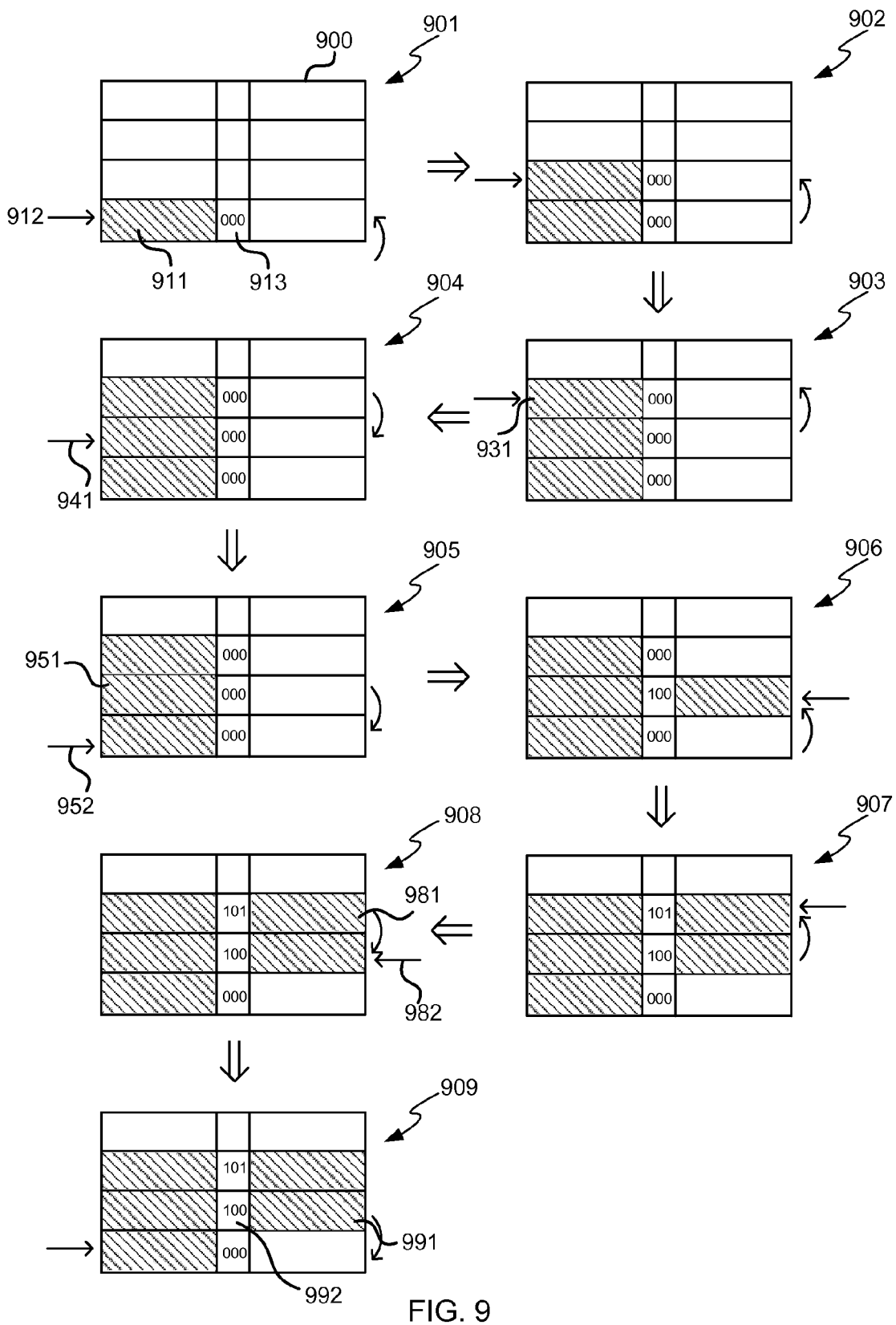
FIG. 9 shows schematic diagrams of a series of operations on a modified RSB according to a second embodiment.

Adding of entries to the modified RSB is shown in the schematic diagrams in FIG. 9. In the first schematic diagram 901, an address is added (in block 814) to the first address slot 911 (with slots storing addresses shown shaded in FIG. 9) in the first entry 912 and the pointer bits 913 are updated (in block 816) to indicate (in bit A) that the first slot (slot 0) was used in this entry. As this is the first entry in the modified RSB, the bit within the pointer bits 913 that relates to this first slot and the previous entry (bit B-left) may have any value and in this example it has a default value of 0. Similarly, the bit within the pointer bits 913 that relates to the second slot and the previous entry (bit B-right) may have any value and in this example it also has a default value of 0. The stack pointer is updated (in block 814) to point to this newly added entry, i.e. entry 912, and the stack pointer bit is updated to point to the first slot (slot 0) in that entry (as indicated in FIG. 9 by the stack pointer arrow being on the left of the modified RSB). The next two schematic diagrams 902-903 show two further addresses being added to the modified RSB 900. In both cases, the addresses are stored in the first address slots in their respective entries and the first pointer bit (bit A) is set to '0' to indicate this. In each of these entries the second pointer bit (bit B-left) is also set to '0' to indicate that in both cases the most recently added addresses in the previous entries are in slot 0 (with bits B-right having default values of 0 in this example). The stack pointers at each stage are shown by arrows and point to the next entry in the RSB to be used and are drawn in FIG. 9 on the left of the modified RSB to indicate a stack pointer bit that points to the first slot (slot 0) and on the right to indicate a stack pointer bit that points to the second slot (slot 1). The stack pointer bit associated with each stack pointer in diagrams 901-903 points to the first slot (slot 0) in the top entry.

In response to a function return (block 822), as shown in the second flow diagram 802 in FIG. 8, an address from the top entry is "popped" from the modified RSB (block 824). In this embodiment, however, "popping" an entry from the modified RSB does not include removing it from the RSB, but instead the address is read from the RSB (in block 824). The correct address is read (in block 824) and this is determined using the stack pointer to determine the entry and the stack pointer bit to determine which slot. Referring to the third schematic diagram 903 in FIG. 9, the address in the first address slot 931 (as indicated by the stack pointer and stack pointer bit) is "popped", i.e. read but not removed. As shown in the fourth schematic diagram 904, the resultant modified RSB still includes the address in address slot 931, but the stack pointer 941 is updated to point to the entry below that slot (rather than the entry of the slot). The new stack pointer bit is determined by reading the appropriate bit B from the address slot that has been "popped". In this case B-left (corresponding to entry 931) is 0, so the stack pointer bit is set to 0 indicating the first address slot.

In response to a further function return (in block 822), as shown in the fifth schematic diagram 905, the address in slot 951 is read (in block 824) but not removed and the stack pointer 952 is updated to point to the entry below that slot and the stack pointer bit is updated to point to the first entry in that slot (as denoted by the stack pointer arrow being on the left).

The next two schematic diagrams 906-907 in FIG. 9 show the result of two further function calls which add addresses to the modified RSB (e.g. using the example flow diagram 801). In each case, the address is stored in an unused address slot in the next entry in the modified RSB, the stack pointer and stack pointer bit is updated and the pointer bits set to indicate the most recently written slot in each entry (bit A) and the most recently written slot in the previous entry (bit B-right) at the time of insertion. In diagrams 906-907 the stack pointer bit points to the second slot in the entry.

The following two schematic diagrams 908-909 illustrate the results of two function returns (e.g. using the example flow diagram 802). As a result of the first of these two function returns, the address in slot 981 is read (as determined based on the stack pointer and stack pointer bit 982) and the stack pointer is updated to point to the entry below that slot with a stack pointer bit identifying the second slot in that entry (as bit B-right associated with slot 981 is set to 1, indicating the second slot). As a result of the second of the two function returns, the address in slot 991 is read (as determined based on the pointer bit A 992) and the stack pointer is updated to point the entry comprising slot 991 with a stack pointer bit identifying the first slot in that entry.

As shown in the third example flow diagram 803 in FIG. 8, when a prediction is made (block 832), the stack pointer for the modified RSB is stored along with the stack pointer bit (block 834). This information may subsequently be used to reset the stack pointer and the stack pointer bit for the RSB in the event that the prediction is determined to be a mis-prediction. The pointer bits within the modified RSB are not reset but the bits B will still be correct following a mis-prediction unless the slot has been overwritten (which is unlikely since addresses are written to the least recently added slot).

The second embodiment described above uses a modified structure for the RSB, which although is potentially less efficient (because it is unlikely that all the address slots in the RSB will be used), reduces the likelihood that data will be lost as a result of mis-speculation. Addresses are not removed when addresses are "popped" from the RSB so entries are not lost as a result of incorrect speculative pops and subsequent function calls do not result in recently written addresses being overwritten. Use of more address slots per data entry (e.g. as shown in FIG. 7) increases the possibly inefficiency but further reduces the likelihood that data will be lost (by being overwritten), even where there is a lot of speculative code running.

Although both the embodiments are described above with reference to an out-of-order processor, the methods are not limited to out-of-order processors and may also be used in processors which execute instructions in order but still use speculation.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of operating a processor, comprising:
   in response to a function call, storing an address following the function call in one of a plurality of address slots in a top entry in a return stack buffer, updating a stack pointer and at least one stack pointer bit to point to the entry and the address slot in which the address was stored and setting a value of two or more pointer bits in the entry, the two or more pointer bits comprising a first part indicating at least a most recently written address slot in the entry and a second part indicating, for each of the plurality of address slots in the entry, a most recently written address slot in the previous entry at the time that the particular one of the plurality of address slots in the entry was written; and
   in response to a function return, reading an address from an address slot in an entry in the return stack buffer identified by the stack pointer and at least one stack pointer bit, updating the stack pointer to point to the previous entry, and updating the at least one stack pointer bit based on the second part of the pointer bits for the entry and the address slot from which the address was read.

2. A method according to claim 1, wherein the address following the function call is stored in a selected one of the plurality of address slots, wherein the address slot is selected using a replacement algorithm.

3. A method according to claim 2, wherein the replacement algorithm selects a least recently used address slot in the entry.

4. A method according to claim 1, wherein the method further comprises:
   storing the stack pointer and the at least one stack pointer bit for the return stack buffer each time a prediction is made in the processor.

5. A method according to claim 1, wherein the return stack buffer comprises a plurality of entries and each entry comprises two address slots and two or more pointer bits.

6. A method according to claim 5, wherein the two or more pointer bits comprise:
   a first part indicating which of the two address slots was most recently written; and
   a second part comprising at least one bit associated with the first address slot and at least one bit associated with the second address slot, wherein the bits associated with an address slot are arranged to indicate a most recently written address slot in the previous entry in the return stack buffer at the time that the particular address slot was written.

7. A method according to claim 1, wherein the return stack buffer comprises a plurality of entries and each entry comprises a plurality of address slots and two or more pointer bits for each address slot.

8. A method according to claim 7, wherein the two or more pointer bits for each address slot comprise:
   a first part indicating whether the address slot was most recently written; and
   a second part arranged to indicate a most recently written address slot in the previous entry in the return stack buffer at the time that the address slot was written.

9. A method according to claim 1, wherein the processor is an out-of-order processor.

10. A processor comprising:
a fetch stage; and
resources arranged to store a return stack buffer comprising more than one address slot in at least a top entry thereof, wherein the fetch stage is arranged:
in response to a function call, to store an address following the function call in a selected address slot in said top entry, to update a stack pointer and at least one stack pointer bit to point to the entry and the address slot in which the address was stored and to set a value of two or more pointer bits in the entry, the two or more pointer bits comprising a first part indicating at least a most recently written address slot in the entry and a second part indicating, for each of the plurality of address slots in the entry, a most recently written address slot in the previous entry at the time that the particular one of the plurality of address slots in the entry was written; and
in response to a function return, to read an address from an address slot in an entry in the return stack buffer identified by the stack pointer and at least one stack pointer bit, to update the stack pointer to point to the previous entry and to update the at least one stack pointer bit based on the second part of the pointer bits for the entry and the address slot from which the address was read.

11. A processor according to claim 10, wherein the address following the function call is stored in a selected one of the plurality of address slots, wherein the address slot is selected using a replacement algorithm.

12. A processor according to claim 11, wherein the replacement algorithm selects a least recently used address slot in the entry.

13. A processor according to claim 10, wherein the processor further comprises a branch predictor and the fetch stage is further arranged to store the stack pointer and the at least one stack pointer bit for the return stack buffer each time a prediction is made in the processor.

14. A processor according to claim 10, wherein the return stack buffer comprises a plurality of entries and each entry comprises at least two address slots and two or more pointer bits.

15. A processor according to claim 10, wherein the return stack buffer comprises a plurality of entries and each entry comprises a plurality of address slots and two or more pointer bits for each address slot.

16. A processor according to claim 10, wherein the processor is an out-of-order processor.

17. A non-transitory computer readable storage medium having stored thereon computer readable instructions that, when executed at a computer system for generating a representation of a digital circuit from definitions of circuit elements and data defining rules for combining those circuit elements, cause the computer system to generate a processor comprising:
a fetch stage; and
resources arranged to store a return stack buffer comprising more than one address slot in at least a top entry thereof, wherein the fetch stage is arranged:
in response to a function call, to store an address following the function call in a selected address slot in said top entry, to update a stack pointer and at least one stack pointer bit to point to the entry and the address slot in which the address was stored and to set a value of two or more pointer bits in the entry, the two or more pointer bits comprising a first part indicating at least a most recently written address slot in the entry and a second part indicating, for each of the plurality of address slots in the entry, a most recently written address slot in the previous entry at the time that the particular one of the plurality of address slots in the entry was written; and
in response to a function return, to read an address from an address slot in an entry in the return stack buffer identified by the stack pointer and at least one stack pointer bit, to update the stack pointer to point to the previous entry and to update the at least one stack pointer bit based on the second part of the pointer bits for the entry and the address slot from which the address was read.

18. A computer readable storage medium according to claim 17, wherein the processor is an out-of-order processor.

* * * * *